Aug. 12, 1952
S. RUBEN
2,606,941
PRIMARY CELL AND BATTERY
Filed May 21, 1946
2 SHEETS—SHEET 1
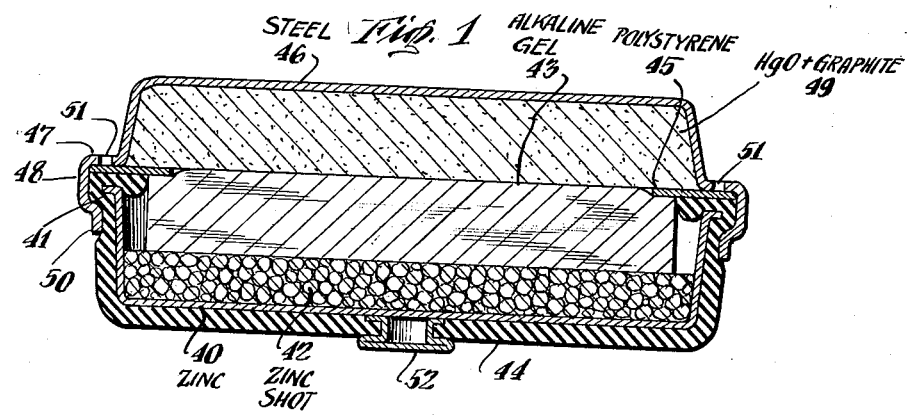
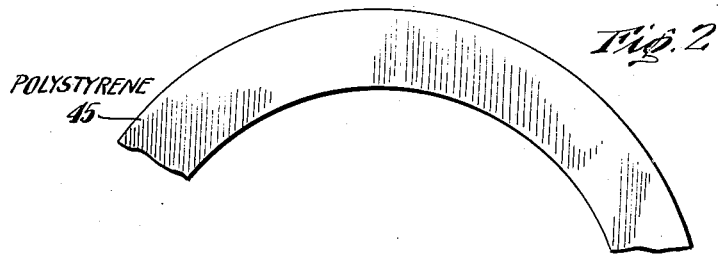
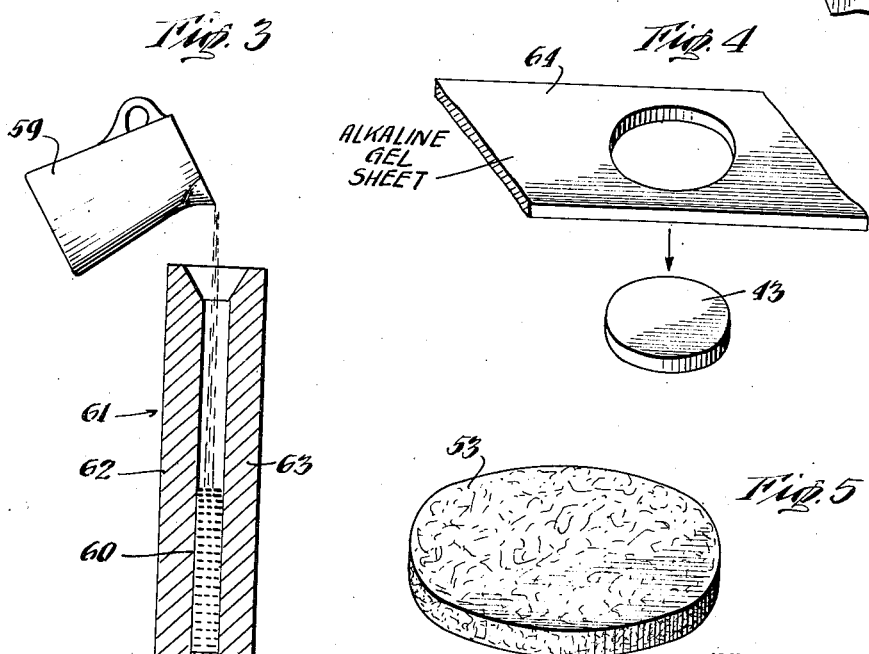
INVENTOR
Samuel Ruben
BY
Nicholas Langer
ATTORNEY Aug. 12, 1952 S. RUBEN 2,606,941
PRIMARY CELL AND BATTERY
Filed May 21, 1946 2 SHEETS—SHEET 2
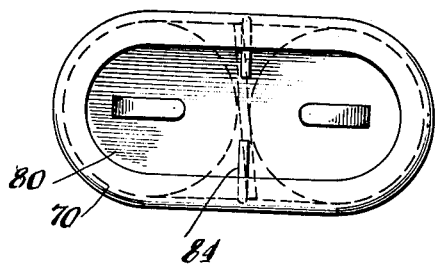
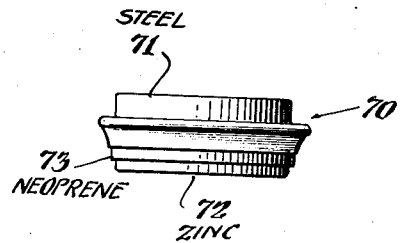
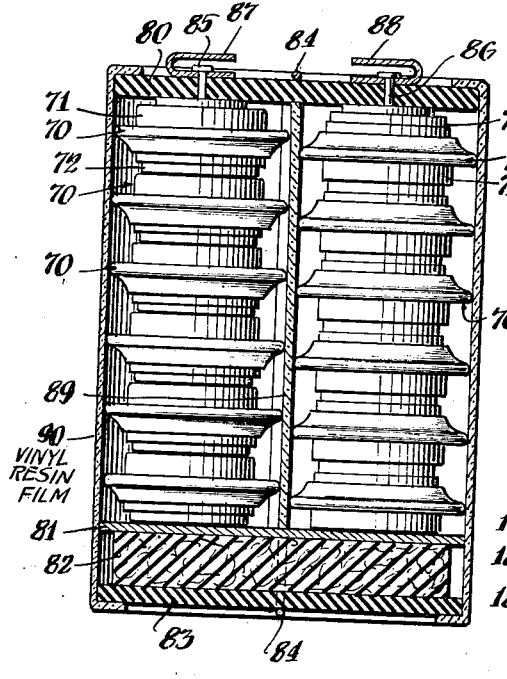
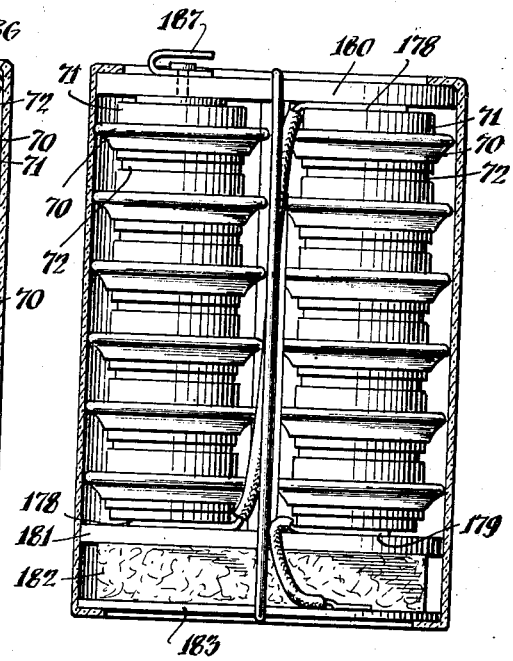
INVENTOR
Samuel Ruben
BY
Nicholas Lauger
ATTORNEY Patented Aug. 12, 1952

2,606,941

UNITED STATES PATENT OFFICE 2,606,941

PRIMARY CELL AND BATTERY

Samuel Ruben, New Rochelle, N. Y.

Application May 21, 1946, Serial No. 671,200

6 Claims. (Cl. 136—111)

This invention relates to alkaline dry cells and batteries.

The present application is a continuation-in-part of my prior filed co-pending applications, Serial No. 601,626, filed June 26, 1945 (U. S. Letters Patent 2,458,878), and Serial No. 604,269, filed July 10, 1945 (U. S. Letters Patent 2,422,045), and Serial No. 631,402, filed November 28, 1945 (U. S. Letters Patent 2,536,696).

An object of the invention is to provide improved structures for dry cells and batteries.

Other objects will be apparent from the following description and claims.

The present invention contemplates a sealed dry cell of novel construction. A feature of the invention resides in the construction of a flat type cell in which the electrolyte may be immobilized by absorbent spacers or by gelling. Further features will be apparent from the following description and the claims.

In the drawings:

Figure 1 is a sectional view of a flat dry cell embodying features of the present invention;

Figure 2 is a face view of a guard ring used therein;

Figures 3 and 4 illustrate steps in the making of an electrolyte element;

Figure 5 shows a modified electrolyte element;

Figure 6 is a side view of a modified flat cell;

Figures 7 and 8 are top and sectional views of a battery of cells embodying features of the invention; and Figure 9 shows a modified battery.

The preferred gel electrolyte for the cells of the present invention comprises an aqueous alkali metal hydroxide solution which is gelled with an alkali metal salt of carboxymethylcellulose, such as sodium carboxymethylcellulose. Sodium carboxymethylcellulose is a cellulose derivative that is readily soluble or dispersible in water, and is supplied by Hercules Powder Co., Wilmington, Delaware, as a white granular powder.

It is also contemplated, for long shelf life under adverse temperature conditions, that the electrolyte may, in some cases, contain a substantial proportion of dissolved alkali metal zincate.

One suitable electrolyte is formed of:

Chemically pure potassium hydroxide (88% KOH) _____ grams__ 100
Zinc oxide _____ do____ 16
Water _____ ml.__ 100

The sodium carboxymethylcellulose is added to the electrolyte in proportions of 6 grams per 100 ml. of solution. In preparing the electrolyte the potassium hydroxide is added to 25 ml. of water and the zinc oxide added. The mixture is stirred and heated to 180–190° C. and then allowed to cool to 110° C., after which 25 ml. of water is added and the solution stirred and cooled to 80° C. The remaining 50 ml. of water is added, a clear solution being obtained. The sodium carboxymethylcellulose is crushed and screened through a 40 mesh screen and is added slowly to the solution, with constant stirring. This forms a mushy suspension which can be converted to a gel by heating to a temperature slightly below the boiling point of the mixture (about 117–120° C.) at which point a clear liquid solution is obtained which, upon cooling, will form a clear, homogeneous, self-supporting gel. It is necessary to heat the solution to within 5 degrees of its boiling point to obtain a clear solution which will give a clear gel on cooling.

Figure 1 is a diametral section through a circular flat cell. This cell comprises an anode formed of a shallow zinc cup 40 having an outwardly flared flange 41 at its edge and a layer 42 of amalgamated zinc shot compressed in the bottom of the cup.

The zinc shot is of graduated sizes all of which pass through a 28 mesh screen. It is amalgamated with liquid mercury (90 grams zinc to 10 grams mercury) under a 15% ammonium hydroxide solution. The mixture is stirred or tumbled in a bottle until the mercury is well distributed after which the zinc is washed with water, vacuum dried at 80° C. and pressed into the cup 40. I have found the amalgamated zinc shot or pellet anode to be freer from any tendency to gas generation in contact with alkaline electrolytes than pressed amalgamated zinc powders. On the other hand, it presents adequate surface area and sufficiently small particle size to be completely consumed during cell operation, even in electrolytes which are initially saturated with potassium zincate.

While I prefer to use the "shot" in the form of small round particles of the desired mesh size, other pellet shapes free of the numerous irregular pointed surfaces characteristic of zinc powder, may be used. For instance, oval or cylindrical pellets of suitable mesh size having rounded surfaces and substantially free of sharp points may be used.

In some cases the cup 40 may be formed of a metal or alloy inert to the electrolyte. In order to avoid generation of gas after the depolarizer has been consumed, it is desirable to balance the quantity of zinc in the anode to the depolarizing capacity of the cathode.

Electrolyte layer 43, formed of a disc of the thick gel previously described, is laid on top of the layer 42. A molded grommet cup 44 of a plastic such as inert vinyl chloride or styrene-butadene composition or rubber is fitted over the bottom free edge of cup 40. The cup 44 has a brass rivet or closed eyelet 52 crimped in a hole in its bottom wall to serve as a contact with the zinc cup 40.

A ring 45 (see Figure 2) of relatively impervious sheet material, such as polystyrene film, parchment paper, regenerated cellulose film or polyvinyl alcohol film is laid on the upper face of the grommet and electrolyte disc. A 5 mil thick ring of clear polystyrene film is most suitable. This ring extends from the outer edge of the grommet in over the edge of electrolyte disc 43 for a distance of 10 to 30% of the radius of the disc, and seals itself to the surface of the electrolyte disc.

The cathode member is compressed in the bottom of a shallow cup 46 of ferrous metal such as iron or steel, whose edge is formed with a flange having a flat circular portion 47 and a cylindrical portion 48 capable of fitting over the outer periphery of grommet 44. A layer 49 of the cathode-depolarizer composition is pressed into cup 46 to the level of flange portion 47. The preferred composition is formed of finely divided mercuric oxide intimately mixed with 5% of micronized graphite.

The cathode-depolarizer layer 49 is pre-impregnated with liquid electrolyte before assembly. This electrolyte may be of the composition previously described, omitting the gelling agent.

The assembly is completed by placing the cathode member down over the anode-electrolyte assembly and spinning in the edge 50 of flange 48 to compress the grommet and seal the cell. The spacing between anode and cathode is slightly less than the original thickness of electrolyte gel disc 43 so that pressure is applied thereto.

The portion 47 of the flange on cup 46 is provided with four small holes 51 spaced 90 degrees apart. In event of any substantial gas pressure within the cell the pressure will cause a slight opening of the joint between flange 47 and ring 45 permitting ready escape of gas through holes 51.

One practical cell of the construction shown in Figure 1 had a cathode 120 mils thick, a gel electrolyte layer 100 mils thick and a pressed zinc shot anode 50 mils thick. The gel disc was 975 mils in diameter.

A smaller cell had a cathode 80 mils thick, a gel disc 85 mils thick and 445 mils in diameter, and a zinc shot anode 35 mils thick.

The grommet cup 44 affords protection against electrolyte leakage at the end of cell life. When the cell reaches the end of its life the wall of zinc cup 40 is considerably weakened, due to the electrolyte action, and brittle due to amalgamation with mercury from the anode layer 42. In this condition it will in some cases break or crack due to internal or external forces. When this occurs the plastic cup 44 will retain the cell intact and prevent any leakage of electrolyte or other cell materials.

Where mercuric oxide is used as the depolarizer material operation of the cell will result in a progressive reduction of the oxide and formation of droplets of liquid mercury. It also results in a shrinkage in diameter of the electrolyte disc 43 due to consumption of water. Ring 45 prevents the liquid mercury from running down around the edge of the electrolyte disc under these conditions since it extends in over the edge of the electrolyte disc by an amount which is greater than any shrinkage the disc will undergo. With other depolarizer materials the ring 45 will not always be necessary, although it is preferably used to prevent small leakage currents through zinc oxide which might form on the edge of the gel disc. The ring 45 is also of advantage in cells using paper spacers impregnated with electrolyte, particularly with mercuric oxide cathodes.

Figure 3 and 4 illustrate a method of making electrolyte discs 43. The clear solution 60 of hot liquid electrolyte containing the gelling agent (such as sodium carboxymethylcellulose) is poured from the beaker 59 into a two part mold 61 comprising spaced parallel plates 62 and 63, where it gels into a flat sheet 64. After cooling the stiff gel sheet 64 is removed from the mold and discs 43 are punched from it.

Figure 5 shows a modified electrolyte disc 53 which comprises a disc of porous absorbent sheet material impregnated with the gel electrolyte. The preferred absorbent material is a pure felted cotton fibre paper, such as Feltril paper, about 60 mils thick. The paper is vacuum impregnated with the unheated and ungelled electrolyte solution or mixture by placing in the solution and applying a vacuum above the solution to draw out air bubbles and then is placed between spaced stainless steel plates and heated to about 120° C. after which it is cooled until the gel has hardened. It is then removed and discs 53 are punched from the sheet.

While mercuric oxide has been described as the depolarizer material, other suitable depolarizers may be used.

While zinc shot is preferred for the anode it is also possible to use other forms of zinc anode member of large surface area, such as a porous pressed body of amalgamated zinc powder or other porous zinc body.

The potassium hydroxide in the electrolyte may vary in concentration, the most useful range extending from 39 to 54% KOH. The proportion of sodium carboxymethylcellulose can vary, the range between 3 and 12 grams per 100 ml. of electrolyte being most suitable. With proportions of potassium hydroxide below 80 grams per 100 ml. of water (39% KOH) the electrolyte does not appear to form a homogeneous clear gel with the sodium carboxymethylcellulose, probably due to freer water. Heating of the electrolyte mixture substantially to the boiling point is also essential to obtaining a clear homogeneous gel.

For maximum shelf life under elevated temperature conditions the electrolyte is given a preliminary content of potassium zincate by dissolving zinc oxide in the solution. The amount of zincate, calculated as zinc, preferably amounts to between 14 and 29 grams of zinc for each 100 grams of potassium present as potassium hydroxide and potassium zincate. Part of the potassium hydroxide originally used is converted to potassium zincate by reaction with the zinc oxide so that the percentage of KOH present as such in the solution is reduced. However, the titratable quantity of potassium hydroxide remains the same due to the reversibility of the reaction with the zinc oxide.

As the zinc anode is converted to zinc hydroxide during operation the thickness of the anode increases. This is compensated for, however, in the structure of the present invention by a progressive decrease in the thickness of the gel electrolyte layer due to withdrawal of moisture to the anode. Hence, the total thickness and internal pressure of the cell assembly remains substantially unchanged throughout operation.

The body of self-sustaining, non-flowing electrolyte gel described herein not only performs the usual function of cell electrolyte in undergoing electrochemical reaction with the electrodes and providing an electrolytically conductive path between them, but also functions as a mechanical spacer and as a barrier to the travel of deleterious compounds, graphite particles and reaction products from cathode to anode. The electrolyte being immobilized into a gel has no free circulation which would carry compounds from one electrode to the other.

A paper or fibre disc can also be impregnated with the hydroxide gel to form an element 53 (Figure 5). In this event less gelling agent may be required, for example 2 grams of sodium carboxymethylcellulose per 100 milliliters of solution.

Other gelling agents which can be used are starch and methyl cellulose.

Figure 6 is a side view of a small cell 70 having a similar internal construction to that of Figure 1. The cell container comprises a steel cup 71, a zinc cup 72 and a synthetic rubber grommet 73. In this case, however, the grommet does not extend over the bottom of the zinc cup but leaves the zinc bottom exposed.

Figures 7 and 8 show a battery formed of such cells. The battery comprises two stacks of six cells each, the left hand stack having all the zinc negative terminals facing downward and the right hand stack having the zinc terminals facing upward. The cells are clamped between a top pheno-formaldehyde plastic plate 80 and a bottom metal plate 81. The metal plate electrically connects the two cell stacks together in series. Below metal plate 81 is a layer of resilient material 82, such as sponge rubber and below this is an insulating plate 83. The entire assembly is clamped together under pressure by a tie wire 84. Insulating plate 80 is provided with a pair of battery terminals comprising rivets 85 and 86 passing through the plate into contact with the top cells of the stacks, and U-shaped contact springs 87 and 88 for connecting the battery to a load circuit.

A partition 89 of insulating sheet plastic is interposed between the two stacks to prevent accidental short circuiting and a plastic sheath 90 encloses the sides of the assembly and is turned over the ends. The sheath may suitably be formed of vinyl polymer resins, such as Vinylite, or of a viscose film. One method of applying a vinyl resin film sheath is as follows: A tube of Vinylite of smaller diameter than will encircle the battery is softened in hot water and then stretched on a form larger than the battery. It is chilled in cold water in the stretched condition after which the form is removed from the expanded tube, which retains its large size. The tube is dried and then slipped over the battery. As it warms up the tube will shrink tightly over the battery into the position illustrated.

The resilient layer 82 of sponge rubber applies uniform pressure to the stack of cells and can take up any swelling of the cells at the end of their life or at any other time.

Figure 9 shows a modified battery having one terminal at each end. In this battery both stacks of cells are arranged with the zinc negative terminals at the bottom. An insulating plate 181 is provided in place of a metal plate between the cells and the resilient layer 182. A conductor 178 connects the stacks together in series. A second conductor 179 connects the end of the right hand stack to a metal plate 183 forming the bottom of the battery. Insulating plate 180 forming the top of the battery has a single terminal 187 thereon connected to the top of the left hand stack.

What is claimed is:

1. An electric current producing cell comprising a pair of dished metal members respectively having inner and outer interfitting marginal regions each of which includes a portion extending substantially radially and a portion extending substantially axially of the cell, such portions of one metal member being substantially parallel-spaced from the corresponding portions of the other member, and an annular insulative sealing grommet also having a substantially radially and a substantially axially extending portion which portions are compressed between the corresponding portions of said metal members, the marginal region of the outer dished member being radially crimped inwardly at a level below the plane defining the inner space of one member from that of the other thereby maintaining the radially extending portion of the grommet under sealing compression in the axial direction and the axially extending portion of the grommet under sealing compression in the radial direction.

2. An electric current producing cell comprising a pair of dished metal terminal members respectively having inner and outer interfitting marginal regions each of which includes a portion extending substantially radially and a portion extending substantially axially of the cell, such portions of one metal member being substantially parallel-spaced from the corresponding portions of the other member, a structurally distinct anode within and in pressure contact with one of said members, a structurally distinct cathode within and in pressure contact with the other of said members, and an annular insulative sealing grommet also having a substantially radially and a substantially axially extending portion which portions are compressed between the corresponding portions of said metal members, the marginal region of the outer dished member being radially crimped inwardly at a level below the plane defining the inner space of one dished member from that of the other thereby maintaining the radially extending portion of the grommet under sealing compression in the axial direction and the axially extending portion of the grommet under sealing compression in the radial direction.

3. An electric current producing cell comprising a pair of structurally independent metal compartments having interfitting marginal regions nested in each other, each of said regions including a portion extending substantially radially and a portion extending substantially axially of the cell, such portions of one metal compartment being substantially parallel-spaced from the corresponding portions of the other compartment, a cathode depolarizer pressed into and consolidated with one of said compartments, an anode pressed into and consolidated with the other of said compartments, an immobilized electrolyte interposed between and in contact with said cathode and anode, and an insulative sealing grommet around the marginal region of one of said compartments also having a substantially radially and a substantially axially extending portion which portions are compressed between the corresponding portions of the compartments, the marginal region of the other compartment being radially crimped inwardly at a level below the plane defining the inner space of one compartment from that of the other thereby maintaining the radially extending portion of the grommet under sealing compression in the axial direction and the axially extending portion of the grommet under sealing compression in the radial direction.

4. An electric current producing cell comprising a pair of structurally independent metal compartments having interfitting marginal regions nested in each other, one of said compartments being formed of steel, each of said marginal regions of the compartments including a portion extending substantially radially and a portion extending substantially axially of the cell, such portions of one compartment being substantially parallel-spaced from the corresponding portions of the other compartment, a structurally distinct cathode within and in pressure contact with said steel compartment, a structurally distinct zinc anode within and in pressure contact with the other compartment, an immobilized electrolyte between said cathode and anode, and an annular insulative sealing grommet mounted around the marginal region of one of said compartments also having a substantially radially and a substantially axially extending portion which portions are compressed between the corresponding portions of the compartments, the marginal region of the other compartment being radially crimped inwardly at a level below the plane defining the inner space of one compartment from that of the other thereby maintaining the radially extending portion of the grommet under sealing compression in the axial direction and the axially extending portion of the grommet under sealing compression in the radial direction.

5. An electric current producing cell comprising a steel compartment, a cathode depolarizer including mercuric oxide pressed into said compartment to form low resistance contact therewith, a second metal compartment, a structurally distinct zinc anode within and in pressure contact with said second compartment, said compartments respectively constituting the positive and negative terminals of the cell and having interfitting marginal regions nested in each other, each of said marginal regions including a portion extending substantially radially and a portion extending substantially axially of the cell, such portions of one compartment being substantially parallel-spaced from the corresponding portions of the other compartment, an immobilized electrolyte between and in contact with said cathode and anode, and an annular insulative sealing grommet mounted around the marginal region of one of said compartments also having a substantially radially and a substantially axially extending portion which portions are compressed between the corresponding portions of the compartments, the marginal region of the other compartment being radially crimped inwardly at a level below the plane defining the inner space of one compartment from that of the other thereby maintaining the radially extending portion of the grommet under sealing compression in the axial direction and the axially extending portion of the grommet under sealing compression in the radial direction.

6. An electric current producing cell comprising a pair of metal cups respectively having inner and outer circumferential marginal regions nested in each other, each of said marginal regions including a portion extending substantially radially and a portion extending substantially axially of the cell, such portions of one cup being substantially parallel-spaced from the corresponding portions of the other cup, and a generally L-shaped insulative sealing grommet around the inner marginal region of the corresponding cup also having a substantially radially and a substantially axially extending portion which portions are compressed between the corresponding portions of the cups, the marginal region of the other compartment being radially crimped inwardly at a level below the plane defining the inner space of one compartment from that of the other thereby maintaining the radially extending portion of the grommet under sealing compression in the axial direction and the axially extending portion of the grommet under sealing compression in the radial direction.

SAMUEL RUBEN.

REFERENCES CITED

The following references are of record in the file of this patent:

UNITED STATES PATENTS

| Number | Name | Date |
|---|---|---|
| Re. 14,929 | Baumann | Aug. 17, 1920 |
| 373,064 | Gassner | Nov. 15, 1887 |
| 408,138 | Schoop | July 30, 1889 |
| 413,438 | Eggers | Oct. 22, 1889 |
| 503,415 | Garbarro | Aug. 15, 1893 |
| 680,848 | Erny | Aug. 20, 1901 |
| 1,137,226 | Manchester | Apr. 27, 1915 |
| 1,219,074 | Bronsted | Mar. 13, 1917 |
| 1,500,027 | Morch | July 1, 1924 |
| 1,611,153 | Benner et al. | Dec. 21, 1926 |
| 1,997,367 | Killian | Apr. 9, 1935 |
| 2,174,437 | Collins | Sept. 26, 1939 |
| 2,307,766 | Deibel | Jan. 12, 1943 |
| 2,399,089 | Anthony | Apr. 23, 1946 |
| 2,509,249 | Rhodes | May 30, 1950 |

FOREIGN PATENTS

| Number | Country | Date |
|---|---|---|
| 16,471 | Great Britain | 1915 |
| 60,860 | Germany | Nov. 25, 1890 |
| 129,423 | Great Britain | July 8, 1919 |
| 224,484 | Switzerland | Mar. 1, 1943 |
| 380,707 | France | Oct. 17, 1907 |
| 513,744 | France | Nov. 5, 1920 |

OTHER REFERENCES

Ser. No. 394,417. Marhenkel (A.P.C.), published May 11, 1943.

Abstract of application 603,739 of Nye, published October 11, 1949.

Hollabaugh et al.: "Industrial and Engineering Chemistry," pages 943 and 944, October 1945.